United States Patent
Patel et al.

(10) Patent No.: US 10,977,136 B2
(45) Date of Patent: Apr. 13, 2021

(54) METHOD AND SYSTEM FOR OFFLOADING A CONTINUOUS HEALTH-CHECK AND RECONSTRUCTION OF DATA USING COMPUTE ACCELERATION DEVICES ON PERSISTENT STORAGE DEVICES

(71) Applicant: Dell Products L.P., Hopkinton, MA (US)

(72) Inventors: Dharmesh M. Patel, Round Rock, TX (US); Rizwan Ali, Cedar Park, TX (US); Ravikanth Chaganti, Bangalore (IN)

(73) Assignee: Dell Products L.P., Hopkinton, MA (US)

( * ) Notice: Subject to any disclaimer, the term of this patent is extended or adjusted under 35 U.S.C. 154(b) by 89 days.

(21) Appl. No.: 16/553,348

(22) Filed: Aug. 28, 2019

(65) Prior Publication Data

US 2021/0064481 A1 Mar. 4, 2021

(51) Int. Cl.
*G06F 11/07* (2006.01)
*G06F 11/14* (2006.01)

(52) U.S. Cl.
CPC ...... *G06F 11/1469* (2013.01); *G06F 2201/82* (2013.01)

(58) Field of Classification Search
CPC ............. G06F 11/1088; G06F 11/1092; G06F 11/1446; G06F 11/1469
USPC .................................................... 714/6.2, 6.21
See application file for complete search history.

(56) References Cited

U.S. PATENT DOCUMENTS

| | | |
|---|---|---|
| 6,445,705 B1 | 9/2002 | Holden et al. |
| 10,852,989 B1 * | 12/2020 | Patel ..................... G06F 3/0659 |
| 2010/0262772 A1 | 10/2010 | Mazina |
| 2015/0293817 A1 * | 10/2015 | Subramanian ...... G06F 11/1448 707/645 |
| 2016/0259693 A1 * | 9/2016 | Sundararaman .... G06F 11/1088 |
| 2019/0056865 A1 * | 2/2019 | Tripathi .................. G06F 3/064 |

* cited by examiner

*Primary Examiner* — Chae M Ko
(74) *Attorney, Agent, or Firm* — Chamberlain, Hrdlicka, White, Williams & Aughtry

(57) ABSTRACT

A method for managing data includes identifying, by a compute acceleration device (CAD) of a persistent storage device, a first chunk, stored in the persistent storage device, to be health-checked using storage metadata, generating a first chunk identifier using the first chunk, making a determination that the first chunk identifier does not match a second chunk identifier stored in the storage metadata, and in response to the determination: obtaining a plurality of chunks associated with the first chunk from a plurality of persistent storage devices of a storage system, wherein the storage system comprises the persistent storage device and the plurality of persistent storage devices, regenerating the first chunk using the plurality of chunks to generate a new first chunk, storing the new first chunk in the persistent storage device, and updating the storage metadata based on storage of the new first chunk.

20 Claims, 13 Drawing Sheets

METHOD AND SYSTEM FOR OFFLOADING A CONTINUOUS HEALTH-CHECK AND RECONSTRUCTION OF DATA USING COMPUTE ACCELERATION DEVICES ON PERSISTENT STORAGE DEVICES

BACKGROUND

Computing devices may include any number of internal components such as processors, memory, and persistent storage. Each of the internal components of a computing device may be used to generate data. The process of generating, storing, and backing-up data may utilize computing resources of the computing devices such as processing and storage. The utilization of the aforementioned computing resources to generate backups may impact the overall performance of the computing resources.

SUMMARY

In general, in one aspect, the invention relates to a method for managing data. The method includes identifying, by a compute acceleration device (CAD) of a persistent storage device, a first chunk, stored in the persistent storage device, to be health-checked using storage metadata, generating a first chunk identifier using the first chunk, making a determination that the first chunk identifier does not match a second chunk identifier stored in the storage metadata, and in response to the determination: obtaining a plurality of chunks associated with the first chunk from a plurality of persistent storage devices of a storage system, wherein the storage system comprises the persistent storage device and the plurality of persistent storage devices, regenerating the first chunk using the plurality of chunks to generate a new first chunk, storing the new first chunk in the persistent storage device, and updating the storage metadata based on storage of the new first chunk.

In general, in one aspect, the invention relates to a non-transitory computer readable medium that includes computer readable program code, which when executed by a computer processor enables the computer processor to perform a method for managing data. The method includes identifying, by a compute acceleration device (CAD) of a persistent storage device, a first chunk, stored in the persistent storage device, to be health-checked using storage metadata, generating a first chunk identifier using the first chunk, making a determination that the first chunk identifier does not match a second chunk identifier stored in the storage metadata, and in response to the determination: obtaining a plurality of chunks associated with the first chunk from a plurality of persistent storage devices of a storage system, wherein the storage system comprises the persistent storage device and the plurality of persistent storage devices, regenerating the first chunk using the plurality of chunks to generate a new first chunk, storing the new first chunk in the persistent storage device, and updating the storage metadata based on storage of the new first chunk.

In general, in one aspect, the invention relates to a data cluster that includes a storage controller, a persistent storage device, a plurality of persistent storage devices, and a compute acceleration device (CAD) operating on the persistent storage device, wherein the first storage controller is programmed to: identify, by the CAD, a first chunk, stored in the persistent storage device, to be health-checked using storage metadata, generate a first chunk identifier using the first chunk, make a determination that the first chunk identifier does not match a second chunk identifier stored in the storage metadata, and in response to the determination: obtain a plurality of chunks associated with the first chunk from the plurality of persistent storage devices of a storage system, wherein the storage system comprises the persistent storage device and the plurality of persistent storage devices, regenerate the first chunk using the plurality of chunks to generate a new first chunk, store the new first chunk in the persistent storage device, and update the storage metadata based on storage of the new first chunk.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
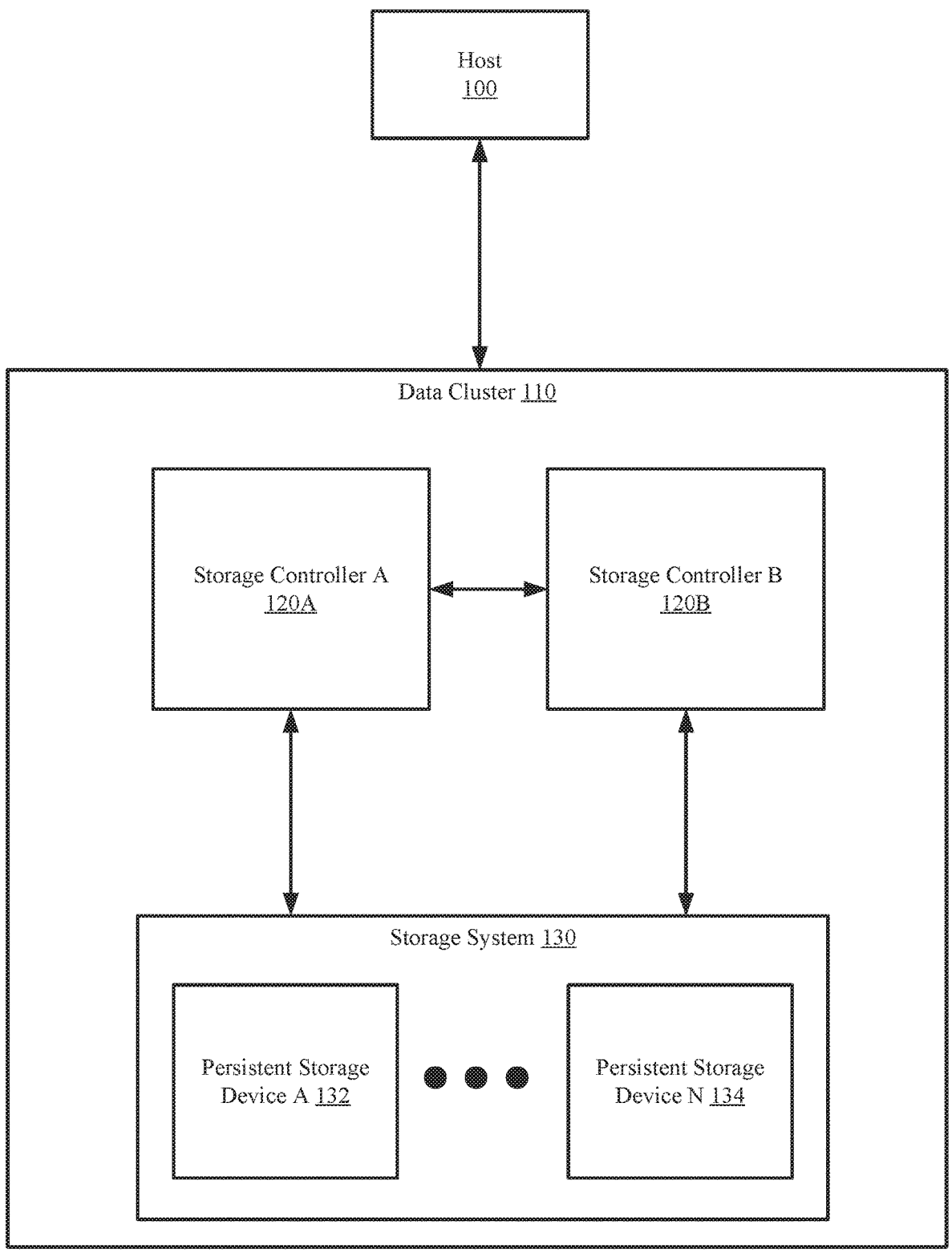
FIG. 1A shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to a method and system for storing data in a data cluster. Embodiments of the invention may utilize a storage controller that applies an erasure coding procedure on data obtained from a host to divide the data into data chunks and to generate parity chunks using the data chunks. Optionally, the storage controller may then perform deduplication on the data chunks to generate deduplicated data that includes deduplicated data chunks. The deduplicated data chunks and the parity chunks are subsequently distributed to persistent storage devices in a storage system in accordance with an erasure coding procedure.

In one or more embodiments of the invention, each persistent storage device in the data cluster is equipped with a compute acceleration device (CAD) that performs a continuous health-check on the data stored in the persistent storage device using the storage metadata stored in memory of the CAD. The health check may include identifying a data or parity chunk and determining whether the chunk is properly stored and accessible in the persistent storage device. If the chunk is not properly stored or accessible, the CAD may perform a reconstruction of the chunk using other chunks stored in other persistent storage devices in the storage system. Embodiments of the invention may further include updating the storage metadata based on the reconstruction and sending an update to other storage controllers.

In one or more embodiments of the invention, the storage controllers are further equipped to monitor the status of the persistent storage devices. If a storage controller determines that a persistent storage device has failed, the storage controller may notify other persistent storage devices of the failure. The persistent storage devices, in response to the notification, may each perform a reconstruction of a portion of the chunks stored in the failed persistent storage device such that the chunks of the failed persistent storage device are all recovered.

FIG. 1A shows a diagram of a system in accordance with one or more embodiments of the invention. The system includes a host (100) and a data cluster (110). The host (100) is operably connected to the data cluster (110) via any combination of wired and/or wireless connections. The system may include additional, fewer, and/or different components without departing from the invention. The components illustrated in FIG. 1A are discussed below.

In one or more embodiments of the invention, the host (100) utilizes the data cluster (110) to store data. The data stored may be backups of databases, files, applications, and/or other types of data without departing from the invention.

Figure 5:
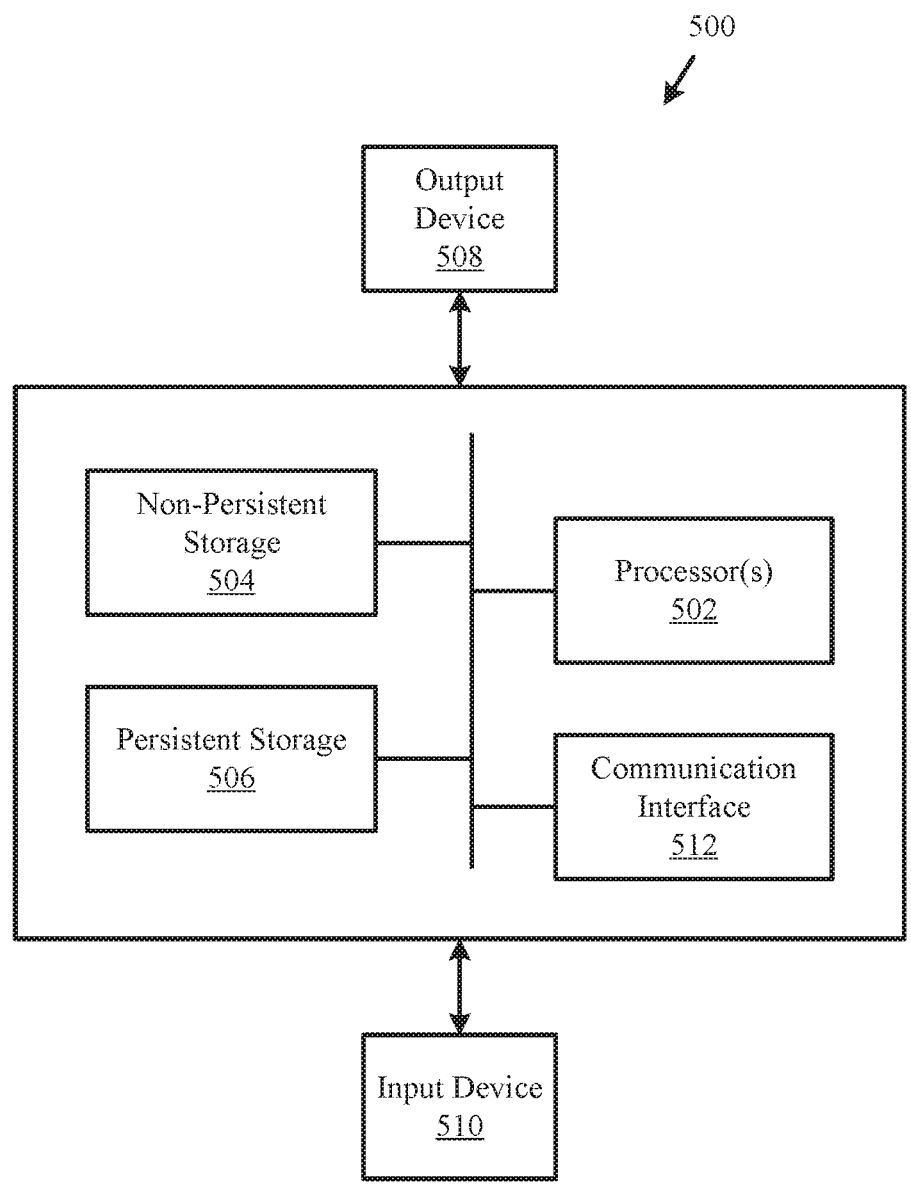
FIG. 5 shows a diagram of a computing device in accordance with one or more embodiments of the invention.

In one or more embodiments of the invention, the host (100) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the host (100) described throughout this application.

In one or more embodiments of the invention, the host (100) is implemented as a logical device. The logical device may utilize the computing resources of any number of computing devices and thereby provide the functionality of the host (100) described throughout this application.

In one or more embodiments of the invention, the data cluster (110) stores data generated by the host (100). The data may be deduplicated versions of data obtained from the host. The data cluster may, via an erasure coding procedure, store portions of the deduplicated data across persistent storage devices operating in the data cluster (110).

As used herein, deduplication refers to methods of storing only portions of files (also referred to as file segments or segments) that are not already stored in persistent storage. For example, when multiple versions of a large file, having only minimal differences between each of the versions, are stored without deduplication, storing each version will require approximately the same amount of storage space of a persistent storage. In contrast, when the multiple versions of the large file are stored with deduplication, only the first version of the multiple versions stored will require a substantial amount of storage. Once the first version is stored in the persistent storage, the subsequent versions of the large file subsequently stored will be de-duplicated before being stored in the persistent storage resulting in much less storage space of the persistent storage being required to store the subsequently stored versions when compared to the amount of storage space of the persistent storage required to store the first stored version.

Continuing with the discussion of FIG. 1A, the data cluster (110) may include at least two storage controllers (120A, 120B) and a storage system (130). Each of the aforementioned components may be operatively connected via any combination of wired and/or wireless connections. Each of the aforementioned components is discussed below.

In one or more embodiments of the invention, each storage controller (120A, 120B) is a device that includes functionality to manage the storage system (130). The storage controllers (120A, 120B) may manage the storage system by performing data processing on data obtained from the host (100) and store processed data in the storage system (130). The data processing may include, for example, deduplication operations and/or erasure coding algorithms on the data in accordance with FIG. 3A.

In one or more embodiments of the invention, the storage controllers (120A, 120B) further manage the storage system (130) by monitoring a status of the persistent storage devices (132, 134) of the storage system (130). The storage controllers (120A, 120B) may, for example, send status updates (also referred to as status requests) to the persistent storage devices (132, 134) and wait for the persistent storage devices (132, 134) to respond. Alternatively, the storage controllers (120A, 120B) may establish a protocol that includes waiting for periodic confirmation of a functioning state from each persistent storage device (132, 134). The storage controllers (120A, 120B) may monitor the status of each of the persistent storage devices (132, 134) via other methods without departing from the invention.

In one or more embodiments of the invention, the storage controllers (120A, 120B) are each implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the storage controller (120A, 120B) described throughout this application and/or all, or a portion thereof, of the methods illustrated in FIGS. 3A and 3C.

In one or more embodiments of the invention, the storage controllers (120A, 120B) are each implemented as a logical device. The logical device may utilize the computing resources of any number of computing devices and thereby provide the functionality of the storage controllers (120A, 120B) described throughout this application and/or all, or a portion thereof, of the methods illustrated in FIGS. 3A and 3C.

In one or more embodiments of the invention, the storage system (130) includes persistent storage devices (132, 134). In one or more embodiments of the invention, the persistent storage devices (132, 134) store data and manage the storage of the data. The data may be data chunks and/or parity chunks. The generation of the data chunks and parity chunks is described below with respect to FIG. 3A.

In one or more embodiments of the invention, the storage system (130) implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and one or more persistent storage devices (132, 134). The computing device may include instructions, stored on the persistent storage devices, that when executed by the processor(s) of the computing device cause the computing device to perform the functionality of the storage system (130) described throughout this application.

In one or more embodiments of the invention, the storage system (130) is implemented as a logical device. The logical device may utilize the computing resources of any number of computing devices and thereby provide the functionality of the storage controllers (120A, 120B) described throughout this application and/or all, or a portion thereof, of the methods illustrated in FIGS. 3A and 3C. For additional details regarding the storage system (130), see, e.g., FIG. 1B.

Figure 3A:
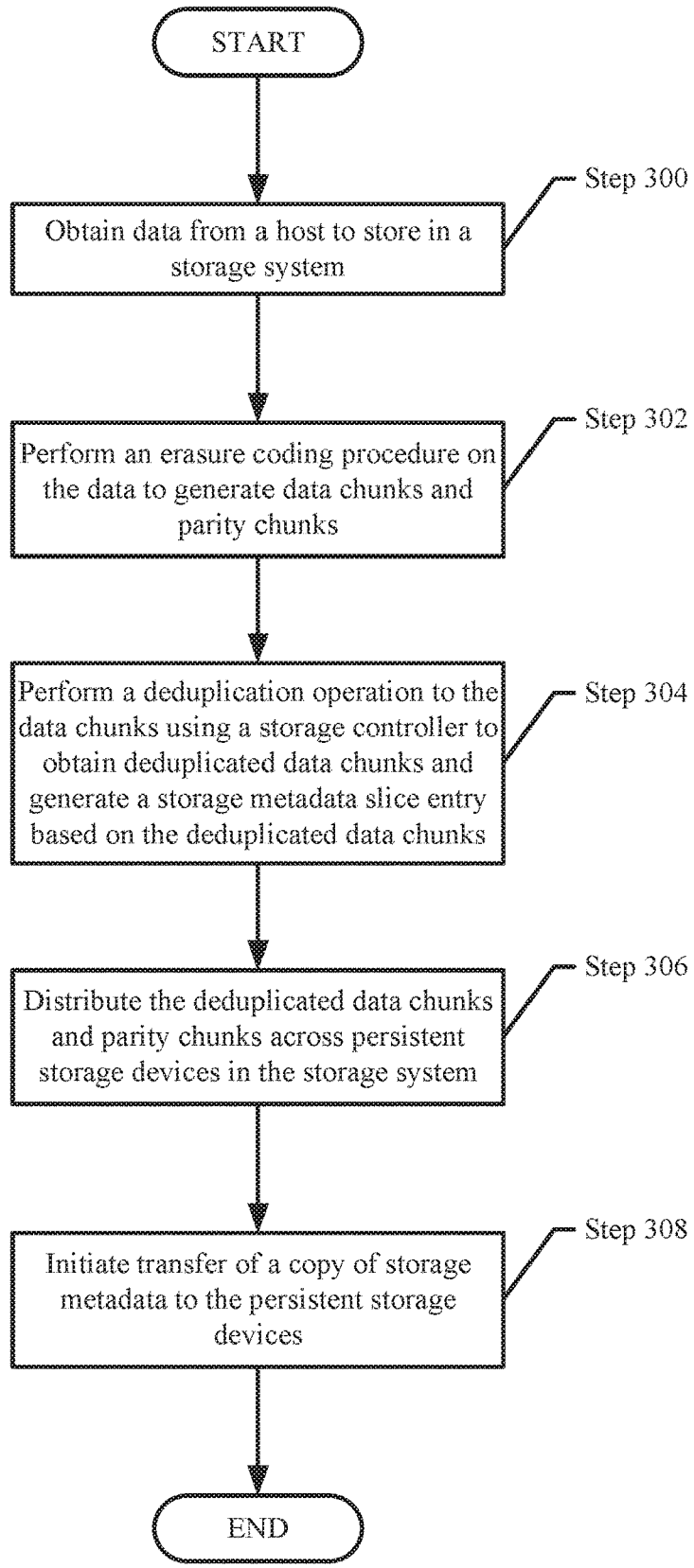
FIG. 3A shows a flowchart for storing data in a data cluster in accordance with one or more embodiments of the invention.
Figure 3B:
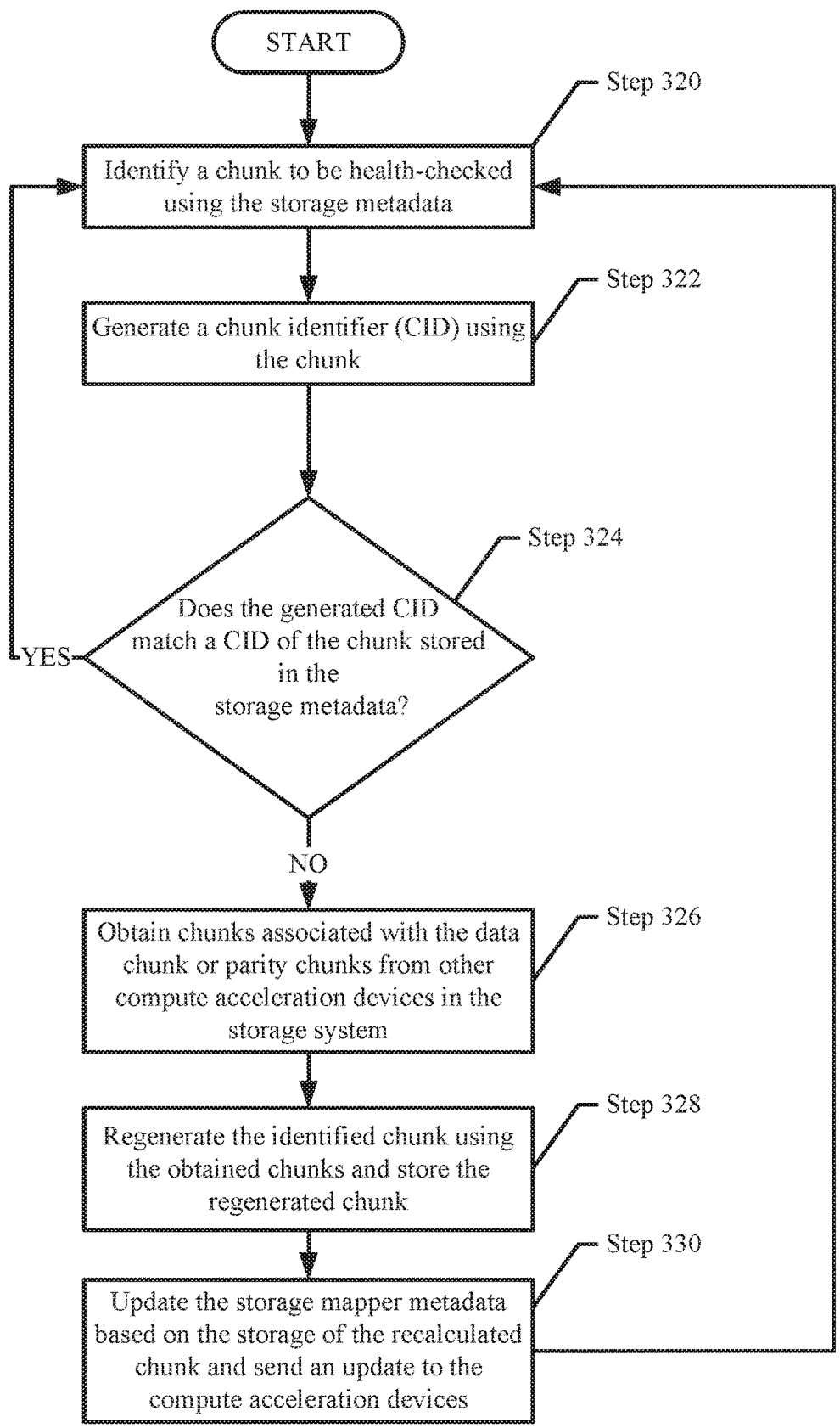
FIG. 3B shows a flowchart for performing a health-check in accordance with one or more embodiments of the invention.

In one or more embodiments of the invention, the persistent storage devices (132, 134) manage the storage of the data chunks and parity chunks by performing health-checks on the chunks and/or reconstruction of data stored locally in the corresponding persistent storage devices (132, 134) in accordance with the method illustrated in FIG. 3B. Said another way, the persistent storage devices (132, 134) may each perform the health-checking and reconstruction functionality as described in FIG. 3B offloaded from the other components in the data cluster (110). In this manner, the storage controllers (120A, 120B) are able to process read and write requests from the clients while the persistent storage devices (132, 134) handles the health-checking and reconstruction functionality thereby not impacting the read/write performance of the storage controllers (120A, 120B) and while improving the health-checking and reconstruction functionality through continuous health-check.

The persistent storage devices (132, 134) may be (or include) non-volatile storage. In other words, the data stored in the persistent storage devices (132, 134) does not get lost or removed when the persistent storage devices (132, 134) lose power. Each of the persistent storage devices (132, 134) may be (or include), for example, solid state drives, hard disk drives, and/or tape drives. The persistent storage devices may include other types of non-volatile or non-transitory storage mediums without departing from the invention. For additional details regarding the persistent storage devices, see, e.g., FIG. 1C.

Figure 1B:
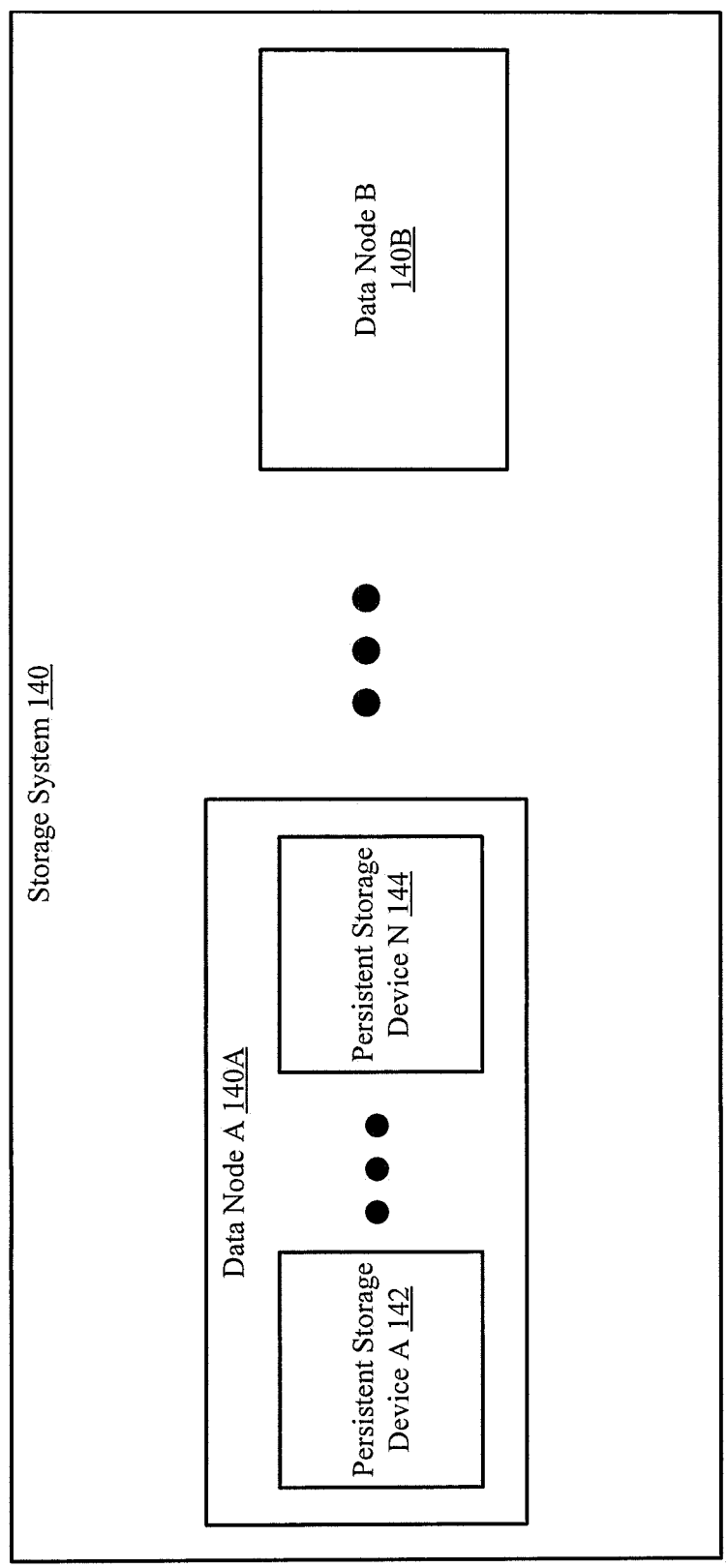
FIG. 1B shows a diagram of a storage system in accordance with one or more embodiments of the invention.

FIG. 1B shows a diagram of a storage system in accordance with one or more embodiments of the invention. The storage system (140) may be an embodiment of the storage system (130, FIG. 1A) discussed above. In one or more embodiments of the invention, the storage system (140) is implemented using one or more data nodes (140A, 140B). Each data node (140A) may host one or more persistent storage devices (142, 144). The data nodes (140A, 140B) may be connected to each other via any combination of wired and/or wireless connections. The storage system (140) may include additional, fewer, and/or different components without departing from the invention.

In one or more embodiments of the invention, the data nodes (140A, 140B) are computing devices that store data. The data may be stored in the persistent storage devices (142, 144). Each data node (140A, 140B) may include functionality for obtaining the data from a host or a storage controller and/or for providing the data to the host and/or storage controller.

In one or more embodiments of the invention, each data node (140A, 140B) in the storage system (140) is equipped with a network interface such as, for example, a network interface controller (NIC), a network switch, etc. The network interface may allow each data node (140A, 140B) to communicate with the data nodes in the storage system (140) for the purpose of, for example, obtaining data from the data nodes.

Figure 1C:
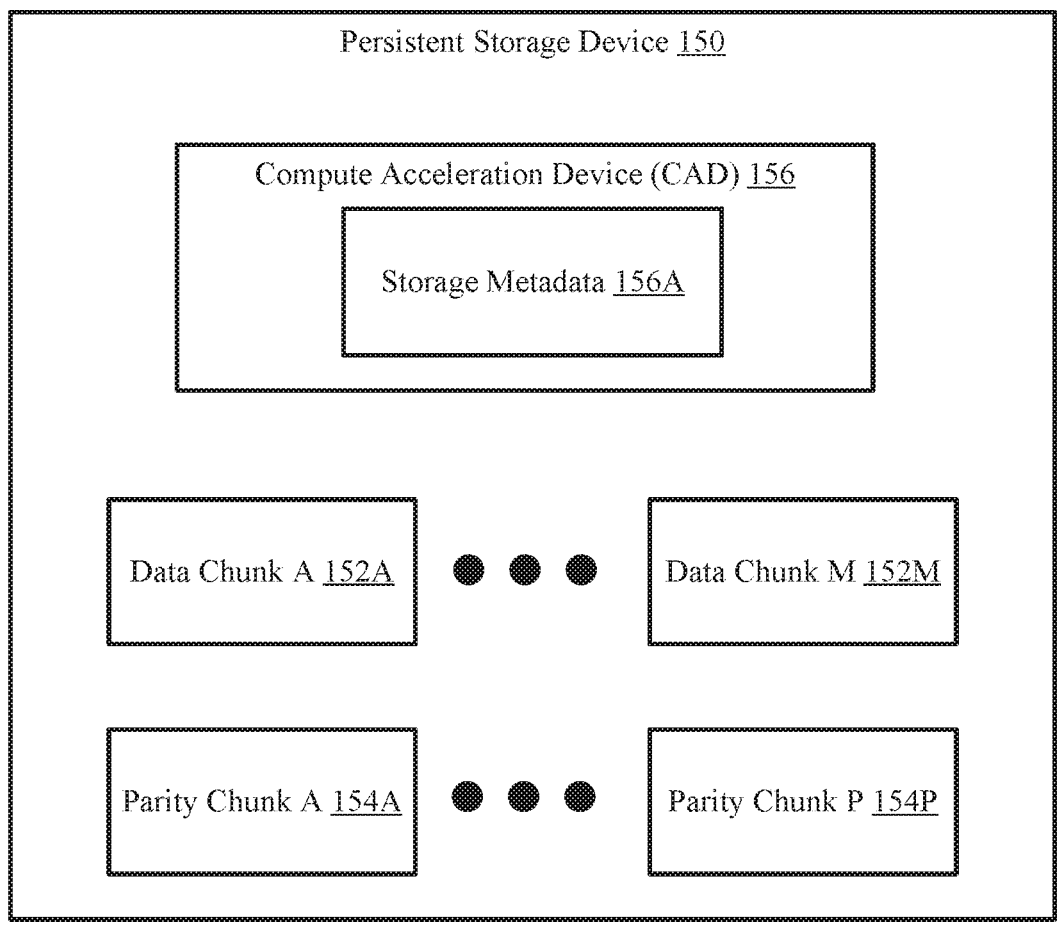
FIG. 1C shows a diagram of a persistent storage device in accordance with one or more embodiments of the invention.

FIG. 1C shows a diagram of a persistent storage device in accordance with one or more embodiments of the invention. The persistent storage device (150) may be an embodiment of a persistent storage device (132, 134, FIG. 1A; 142, 144, FIG. 1B) discussed above. As discussed above, the persistent storage device (150) stores data and includes functionality for performing health-checks. To perform the aforementioned functionality, the persistent storage device (150) includes a compute acceleration device (CAD) (156). The data may be data chunks (152A, 152M) and parity chunks (154A, 154P). The system may include additional, fewer, and/or different components without departing from the invention.

In one or more embodiments of the invention, the CAD (156) is equipped to continuously health-check the data stored in the persistent storage devices (146A, 146N). The CAD (156) may be further equipped to reconstruct data chunks that have become corrupt or otherwise inaccessible. For additional details regarding the health-check and/or the reconstruction, see, e.g., FIG. 3B.

In one or more embodiments of the invention, the CAD (156) is a physical device that includes processing hardware (not shown) and memory (not shown). The CAD (156) may include other elements/components without departing from the invention. The processing hardware may include, but is not limited to, a field-programmable gate array, application specific integrated circuit, programmable processor, microcontroller, digital signal processor, a host bus adapter (HBA) card, other processing hardware, or any combination thereof. Depending on the implementation, the CAD (156) may also include persistent storage that may include computer readable instructions, which may be executed by the processing hardware, to perform all or a portion of the functionality of method shown in FIGS. 3B and 3D. The memory may be, for example, Random Access Memory (RAM). The memory (or volatile storage) in the CAD may include a copy of the storage metadata (156A). The processing hardware may be adapted to provide the functionality of the CAD (156) described throughout this application and/or all, or a portion thereof, of the methods illustrated in FIG. 3B.

In one or more embodiments of the invention, the storage metadata (156A) is a data structure that specifies the data chunks and the parity chunks stored in the data cluster (110; FIG. 1A), which includes the data chunks (152A, 152M) and parity chunks (154A, 154P) stored in the persistent storage device (150). The storage metadata (156A) may further store storage location information of the data chunks and parity chunks.

In one or more embodiments of the invention, the storage metadata (156A) is stored in CAD (156). A copy of the storage metadata (156A) may be distributed to a second persistent storage device after data associated with the storage metadata (156A) is generated and stored in the persistent storage device (150). In this manner, if the storage metadata (156A) stored in the first persistent storage device (e.g., 150) experiences a failure (e.g., it becomes unavailable, corrupted, etc.), the storage metadata (156A) may be recovered from the second persistent storage device. For additional details regarding the storage metadata (156A), see, e.g., FIG. 2.

In one or more embodiments of the invention, a data chunk (152A, 152M) is a portion of data that was obtained from a host (100). The data chunks may be processed by a storage controller. Each of the data chunks (152A, 152M) may be used by the CAD (156) to reconstruct another data chunk or a parity chunk based on an erasure coding algorithm that was applied to the other data chunk or parity chunk.

In one or more embodiments of the invention, a parity chunk (154A, 154P) is a data structure that includes a parity value generated using an erasure coding algorithm. The parity value may be generated by applying the erasure coding algorithm to one or more data chunks stored in the storage system of the persistent storage device (150). Each of the parity chunks (154A, 154P) may be used by a storage controller (120A, 120B), along with other data chunks and/or parity chunks, to reconstruct another parity chunk or a data chunk based on an erasure coding algorithm that was applied to the other parity chunk or data chunk.

Figure 2:
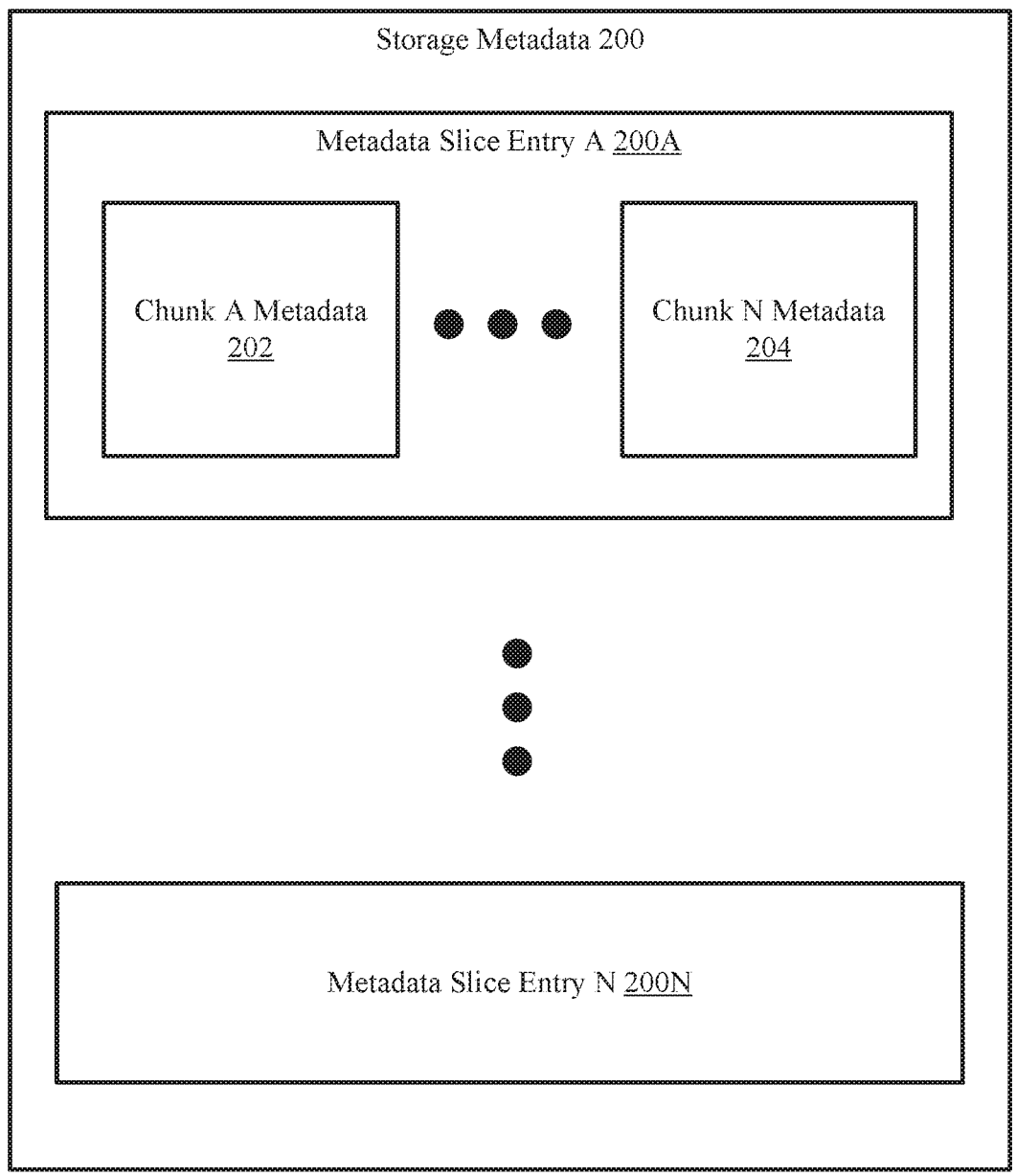
FIG. 2 shows a diagram of storage metadata in accordance with one or more embodiments of the invention.

FIG. 2 shows a diagram of storage metadata in accordance with one or more embodiments of the invention. The storage metadata (200) may be an embodiment of the storage metadata (122, 124, FIG. 1) discussed above. As discussed above, the storage metadata (200) stores information about data chunks or parity chunks. The storage information may include one or more metadata slice entries (200A, 200N). Each metadata slice entry (200A, 200N) may include chunk metadata (202, 204). Each of the aforementioned portions of the storage metadata (200) is discussed below.

In one or more embodiments of the invention, a metadata slice entry (200A, 200N) is an entry that specifies metadata associated with chunks of a data slice. The metadata slice entry (200A, 200N) includes chunk metadata (202, 204). Each chunk metadata (202, 204) may be associated with a data chunk or a parity chunk. Each chunk metadata (202, 204) may include information about a chunk such as, for example, a unique identifier (e.g., a fingerprint also referred to as a Chunk Identifier (CID)) and a storage location of the chunk. The unique identifier of a chunk may be generated using the chunk (e.g., calculated using the data of the chunk). The data chunk referenced in the chunk metadata may be either a deduplicated data chunk or non-deduplicated data chunk.

FIG. 3A shows a flowchart for storing data in a data cluster in accordance with one or more embodiments of the invention. The method shown in FIG. 3A may be performed by, for example, a storage controller (120A, 120B, FIG. 1A). Other components of the system illustrated in FIG. 1A may perform the method of FIG. 3A without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 300, data is obtained from a host to be stored in a storage system. The data may be a file, a file segment, a collection of files, or any other type of data without departing from the invention.

In step 302, an erasure coding procedure is performed on the data to generate data chunks and parity chunks. In one or more embodiments of the invention, the erasure coding procedure includes dividing the obtained data into portions, referred to as data chunks. Each data chunk may include any number of data segments associated with the obtained data. The individual data chunks may then be combined (or otherwise grouped) into slices (also referred to as Redundant Array of Independent Disks (RAID) slices). One or more parity values are then calculated for each of the aforementioned slices. The number of parity values may vary based on the erasure coding algorithm that is being used as part of the erasure coding procedure. Non-limiting examples of erasure coding algorithms are RAID-3, RAID-4, RAID-5, and RAID-6. Other erasing coding algorithms may be used without departing from the invention. Continuing with the above discussion, if the erasing code procedure is implementing RAID 3, then a single parity value is calculated. The resulting parity value is then stored in a parity chunk. If erasure coding procedure algorithm requires multiple parity values to be calculated, then the multiple parity values are calculated with each parity value being stored in a separate data chunk.

As discussed above, the data chunks are used to generate parity chunks in accordance with the erasure coding procedure. More specifically, the parity chunks may be generated by applying a predetermined function (e.g., P Parity function, Q Parity Function, etc.), operation, or calculation to at least one of the data chunks. Depending on the erasure coding procedure used, the parity chunks may include, but are not limited to, P parity values and/or Q parity values.

In one embodiment of the invention, the P parity value is a Reed-Solomon syndrome and, as such, the P Parity function may correspond to any function that can generate a Reed-Solomon syndrome. In one embodiment of the invention, the P parity function is an XOR function.

In one embodiment of the invention, the Q parity value is a Reed-Solomon syndrome and, as such, the Q Parity function may correspond to any function that can generate a Reed-Solomon syndrome. In one embodiment of the invention, a Q parity value is a Reed-Solomon code. In one embodiment of the invention, $Q=g_0 \cdot D_0 + g_1 \cdot D_1 + g_2 D_2 + \ldots + g_{n-1} \cdot D_{n-1}$, where Q corresponds to the Q parity, g is a generator of the field, and the value of D corresponds to the data in the data chunks.

In one or more embodiments of the invention, the number of data chunks and parity chunks generated is determined by the erasure coding procedure, which may be specified by the host, by the data cluster, and/or by another entity.

In step 304, a deduplication operation is performed on the data chunks to obtain deduplicated data chunks. Additionally, a storage metadata slice entry is generated based on the data chunks and the parity chunks. In one or more embodiments of the invention, the deduplication is performed by identifying the data chunks of the obtained data and assigning a fingerprint to each data chunk. A fingerprint is a unique identifier that may be stored in metadata of the data chunk. The storage controller performing the deduplication may generate a fingerprint for a data chunk and identify whether the fingerprint matches an existing fingerprint stored in the storage metadata. If the fingerprint matches an existing fingerprint, the data chunk may be deleted, as it is already stored in the data cluster. If the fingerprint does not match any existing fingerprints, the data chunk may be stored as a deduplicated data chunk. Additionally, the fingerprint of each deduplicated data chunk is stored in a storage metadata slice entry of the storage metadata. A fingerprint (or other unique identifier) of each parity chunk is also generated and stored in the storage metadata slice entry.

In one or more embodiments of the invention, the deduplicated data chunks collectively make up the deduplicated data. In one or more embodiments of the invention, the deduplicated data chunks are the data chunks that were not deleted during deduplication.

In step 306, the deduplicated data chunks and parity chunks are stored across persistent storage devices in the storage system. As discussed above, the deduplicated data chunks and the parity chunks are stored in a manner that minimizes reads and writes from the storage system. In one embodiment of the invention, this minimization is achieved by storing data chunks and parity chunks, which are collective referred to as a data slice (or slice), in the same manner as a prior version of the data slice. The storage controller may use, as appropriate, storage metadata for the previously stored data chunks and parity chunks to determine where to store the data chunks and parity chunks in step 306.

More specifically, in one embodiment of the invention, if the deduplicated data chunks and parity chunks are the first version of a data slice (as opposed to a modification to an existing/previously stored data slice), then the deduplicated data chunks and parity chunks may be stored across the persistent storage devices in the storage system. The location in which the data chunk or parity chunk is stored is specified in the storage metadata slice entry. The scenario does not require the storage controller to use location information for previously stored data chunks and parity chunks.

However, if the deduplicated data chunks and parity chunks are the second version of a slice (e.g., a modification to a previously stored slice), then the deduplicated data chunks and parity chunks are stored across the persistent storage devices using prior stored location information. The location in which the data chunk or parity chunk is stored is specified in the storage metadata slice entry.

For example, consider a scenario in which the first version of the slice includes three data chunks (D1, D2, D3) and one parity chunk (P1) and that they were stored as follows: storage device 1 stores D1, storage device 2 stores D2, storage device 3 stores D3, and storage device 4 stores P1. Further, in this example, a second version of the slice is received that includes three data chunks (D1, D2', D3) and one newly calculated parity chunk (P1'). After deduplication only D2' and P1' need to be stored. Based on the prior storage locations (also referred to as locations) of the data chunks (D1, D2, and D3) and parity chunks (P1) for the first version of the slice, D2' is stored on storage device 2 and P1' is stored on storage device 4. By storing the D2' on storage device 2 and P1' on storage device 4 the data chunks and parity chunks associated with the second slice satisfy the condition that all data chunks and parity chunks for the second version of the slice are being stored in separate persistent storage devices. If the location information was not taken into account, then the entire slice (i.e., D1, D2', D3, and P1') would need to be stored in order to guarantee that the requirement that all data chunks and parity chunks for the second version of the slice are being stored in separate persistent storage devices is satisfied.

In one or more embodiments of the invention, if the persistent storage device that obtains the deduplicated data chunk, which is a modified version of a prior stored deduplicated data chunk, then the storage controller may specify for the persistent storage device to: (i) store the modified version of the deduplicated data chunk (i.e., the persistent storage device would include two versions of the data chunk) or (ii) store the modified version of the deduplicated data chunk and delete the prior version of the deduplicated data chunk.

In one embodiment of the invention, the storage controller includes functionality to determine whether a given data chunk is a modified version of a previously stored data chunk. Said another way, after the data is received from a host divided into data chunks and grouped into slices, the storage controller includes functionality to determine whether a slice is a modified version of a prior stored slice. The storage controller may use the fingerprints of the data chunks within the slice to determine whether the slice is a modified version of a prior stored slice. Other methods for determining whether a data chunk is a modified version of a prior stored data chunk and/or whether a slice is a modified version of a prior slice without departing from the invention.

In step 308, a transfer of a copy of storage metadata is initiated to one or more persistent storage devices. In one or more embodiments of the invention, the storage metadata is distributed by generating a copy of the storage metadata that includes the storage metadata slice entry generated in step 304 and sending the copy of storage metadata to multiple persistent storage devices in the storage system. Alternatively, the transfer of the copy of storage metadata is initiated by sending the copy of the storage metadata to one persistent storage device and prompting the persistent storage device to distribute the copy of storage metadata to other persistent storage devices in the storage system. In this manner, a copy of the storage metadata is stored in multiple storage controllers in the event of a storage metadata failure in one storage controller.

While FIG. 3A describes erasure coding and deduplicating the data, embodiments of the invention may be implemented where the data is only erasure coded and not deduplicated. In such embodiments, step 304 includes generating a storage metadata slice using non-deduplicated data chunks and parity chunks and step 306 includes distributing non-deduplicated data chunks and parity chunks.

FIG. 3B shows a flowchart for performing a health-check in accordance with one or more embodiments of the invention. The method shown in FIG. 3B may be performed by, for example, a CAD (156, FIG. 1C). Other components of the system illustrated in FIG. 1C may perform the method of FIG. 3B without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 320, a chunk to be health-checked is identified using storage metadata of the CAD. In one or more embodiments of the invention, the CAD may select a chunk (e.g., a data chunk or a parity chunk) stored in the persistent storage device hosting the CAD based on a policy implemented by the CAD to continuously health-check chunks stored in the persistent storage device. The policy used to the select the chunk may ensure that: (i) all chunks in the persistent storage device are accessible, (ii) ensure that highly used chunks (i.e., chunks that are read frequently) are accessible, and/or (iii) ensure that chunks identified as important by a user, an application, etc. are accessible. Other policies may be implemented without departing from the invention. The CAD may use the storage metadata (e.g., the storage metadata on the CAD) to identify a storage location of the chunk. The CAD may use the storage metadata to identify a storage location (e.g., a disk sector of the persistent storage device) of the chunk.

In step 322, a chunk identifier (CID) is generated using the chunk. The CID is generated by performing a function on the chunk to obtain a unique identifier (e.g., a fingerprint) that is generated based on the content of the data in the chunk. The result is a generated CID.

In one or more embodiments of the invention, the function performed on the data is a hash function. The storage controller may perform a hash function on the chunk to obtain a hash value. The hash value may be used as the generated CID.

In step 324, the CAD compares the generated CID to a CID (also referred to as a fingerprint) associated with the chunk stored in the storage metadata. After comparing the generated CID to a CID of the storage metadata, a determination is made about whether the generated CID matches the CID of the storage metadata. If the generated CID matches the CID of the storage metadata, the method proceeds to step 320; otherwise, the method proceeds to step 326.

In one or more embodiments of the invention, the determination that the generated CID does not match the CID of the storage metadata implies an unavailability of the chunk. The chunk may be, for example, corrupted or otherwise inaccessible.

In step 326, chunks associated with the identified chunk are obtained from other persistent storage devices in the storage system. In one or more embodiments of the invention, the CAD uses the storage metadata to identify a number of chunks to be obtained. The storage metadata may specify a storage metadata slice associated with the chunk. The storage metadata slice may specify chunk metadata for other chunks of the metadata slice. The chunk metadata for the other chunks may include a storage location for each of the other chunks. Specifically, the storage location of a chunk may specify, for example, a persistent storage device and/or a disk sector of the persistent storage device in which the chunk is stored. The CAD may use the chunk metadata of the other chunks to obtain the other chunks. Obtaining the other chunks may include sending a request to each CAD of the other persistent storage devices storing the other chunks. The other CADs of the other persistent storage devices may each: (i) receive the request, (ii) use the information in the request (e.g., a CID of a chunk) to identify the location of the chunk in the data node; and (iii) send a response that includes the requested chunk back to the CAD (i.e., the CAD that sent the request received in step (i)).

In step 328, the identified chunk is regenerated using the obtained chunks and stored in the storage system. In one or more embodiments of the invention, the identified chunk is regenerated using the erasure coding algorithm applied to the data chunks and parity chunks of the data slice. The erasure coding algorithm may be applied to the other chunks (a portion of which may be data chunks while the other portion may be parity chunks that were generated using the erasure coding procedure) to generate a chunk.

In step 330, the storage metadata is updated based on the storage of the regenerated chunk, and an update is sent to all persistent storage devices in the storage system. In one or more embodiments of the invention, the storage metadata is updated by updating the chunk metadata of the metadata slice entry associated with the regenerated chunk with the new storage location of the regenerated chunk. Additionally, if the CID of the regenerated chunk has changed, the chunk metadata is further updated with the new CID. The CAD may send the update to the storage metadata to other CADs of the storage system as well as to the storage controller. In this manner, the storage metadata is consistent throughout the storage system.

Figure 3C:
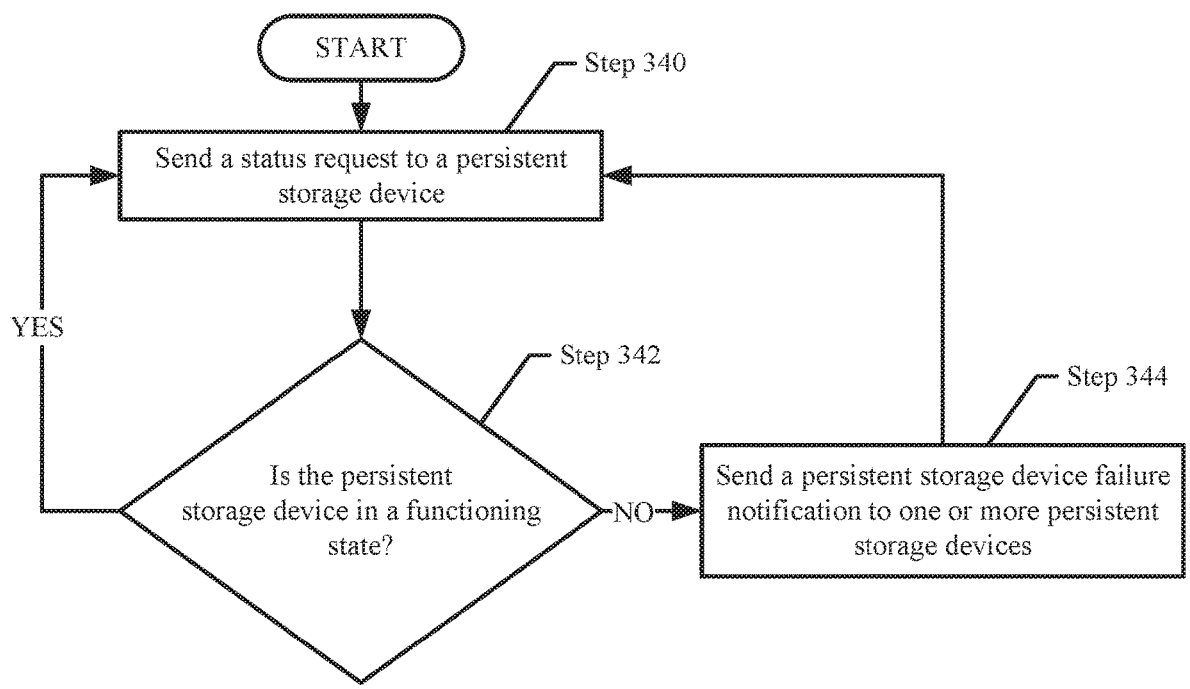
FIG. 3C shows a flowchart for managing a persistent storage device failure in accordance with one or more embodiments of the invention.

FIG. 3C shows a flowchart for managing a persistent storage device failure in accordance with one or more embodiments of the invention. The method shown in FIG. 3C may be performed by, for example, a storage controller (120A, 120B, FIG. 1A). Other components of the system illustrated in FIG. 1A may perform the method of FIG. 3C without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 340, a status request is sent to a persistent storage device. In one or more embodiments of the invention, the status request specifies a request to respond with confirmation that the persistent storage device is accessible (or otherwise in a functioning state).

In step 342, a determination is made about whether the persistent storage device is in a functioning state. In one or more embodiments of the invention, the determination is made based on whether a response is obtained from the persistent storage device. If a response is obtained, the storage controller may determine that the persistent storage device is in a functioning state. Conversely, if a response is not obtained, the storage controller may determine that the persistent storage device is not in a functioning state.

In another embodiment of the invention, the persistent storage device may be configured to periodically send messages to the storage controller. The storage controller may then determine the state of the persistent storage device based on whether or not a message has been received within the expected timeframe. For example, if the persistent storage device is configured to send messages to the storage controller every five minutes, then the storage controller expects to receive a message every five minutes from the second storage controller. The storage controller may determine the persistent storage device to not be in a functioning state if the storage controller does not receive a message within the expected five minutes. Other mechanisms may be used to determine the functioning state of the persistent storage device without departing from the invention.

If the persistent storage device is in a functioning state, the method proceeds to step 340; otherwise, the method proceeds to step 344.

In step 344, a persistent storage device failure notification is sent to one or more persistent storage devices. The persistent storage device failure notification may specify that the persistent storage device of step 340 (also referred to as the failed persistent storage device) is not in a functioning state.

In one or more embodiments of the invention, each persistent storage device failure notification sent to a persistent storage device further specifies a portion of the chunks in the failed persistent storage device to be reconstructed by the corresponding persistent storage device. For example, if a failed persistent storage device stored chunks C1, C2, C3, and C4, the storage controller may send a first persistent storage device failure notification to a first persistent storage device PSD1 that specifies C1 and C2 to be reconstructed by PSD1. Further, the storage controller may send a second persistent storage device failure notification to a second persistent storage device PSD2 that specifies C3 and C4 to be reconstructed by PSD2.

Continuing with the above example, in contrast to specifying the chunks to be restored, the storage controller may send a failed persistent storage device failure notification to each of PSD1 and PSD2, which specifies the failed persistent storage device (e.g., PSDA) using a PSD identifier "PSDA" of the failed persistent storage device. In this scenario, the storage controller allows PSD1 and PSD2 to determine the chunks to be reconstructed based on the data stored in the respective persistent storage devices using the PSD identifier.

Figure 3D:
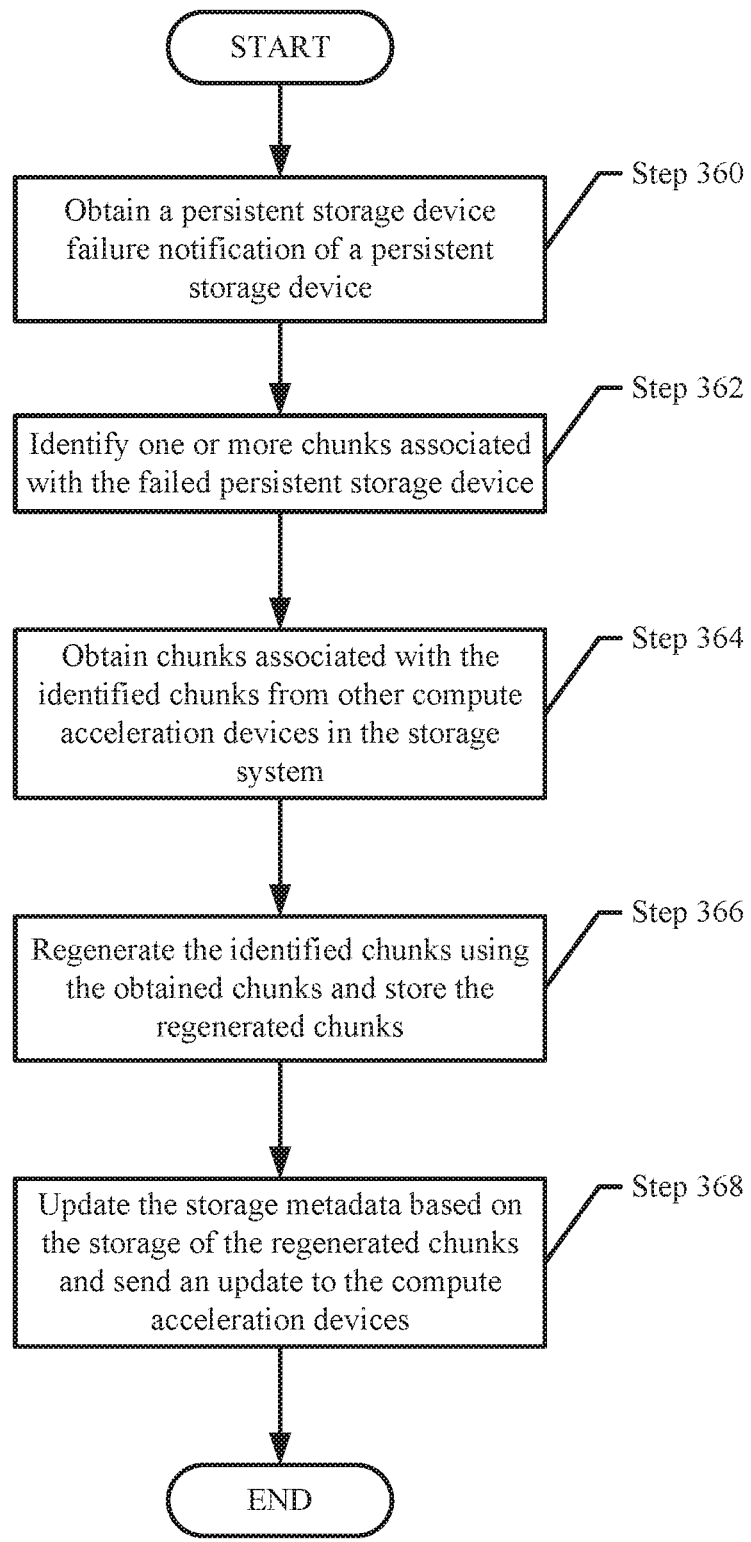
FIG. 3D shows a flowchart for performing data reconstruction in accordance with one or more embodiments of the invention.

For example, PSD1 may use the PSD identifier "PSDA" in combination with the storage metadata stored in the CAD of PSD1 to identify one or more data chunks to be reconstructed in accordance with FIG. 3D.

FIG. 3D shows a flowchart for performing data reconstruction in accordance with one or more embodiments of the invention. The method shown in FIG. 3D may be performed by, for example, a CAD (156, FIG. 1C). Other components of the system illustrated in FIG. 1C may perform the method of FIG. 3B without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 360, a persistent storage device failure notification is obtained for a failed persistent storage device. The failed persistent storage device may be specified in the persistent storage device failure notification. Further, a set of chunks stored in the failed persistent storage device may be specified in the persistent storage device failure notification.

In step 362, one or more chunks associated with the failed persistent storage device are identified. In one or more embodiments of the invention, if the persistent storage device failure notification does not specify chunks stored in the failed in the persistent storage device, the persistent storage device may implement a policy for identifying a set of chunks to be reconstructed. The policy may specify a set of chunks for the persistent storage device to reconstruct for each persistent storage device in the storage system. The persistent storage device may use the policy to identify the failed persistent storage device and identify, using the policy, the set of chunks to be reconstructed.

For example, a policy implemented by the persistent storage device may specify chunks CA1 and CA2 to be reconstructed if persistent storage device PSD1 fails. Further, the policy may specify that chunks CB1 and CB2 to be reconstructed if persistent storage device PSD2 fails. The persistent storage device failure notification may specify PSD2. The persistent storage device obtaining the persistent storage device failure notification may identify chunks CB1 and CB2 to be reconstructed using the policy.

In one or more embodiments of the invention, the policy specifies assigning a persistent storage device leader that assigns the chunks to be reconstructed. For example, the persistent storage device leader may be assigned based on an identifier of the persistent storage device; the persistent storage device with the lowest numbered persistent storage device identifier (excluding the failed persistent storage device) may be the persistent storage device leader. The policy may specify other methods for determining the persistent storage device leader without departing from the invention. This policy may be consistent throughout the persistent storage devices in the storage system so as to allow coherency when a set of chunks is assigned to each persistent storage device. In other words, the consistency in policy may prevent two or more persistent storage device leaders from being determined and unintentionally assigning two different sets of chunks to each persistent storage device for reconstruction.

After the persistent storage device leader is determined based on the policy, the persistent storage device leader may assign the chunks of the failed persistent storage device to each persistent storage device. The persistent storage device may send a second notification to each persistent storage device that specifies the assigned chunks to each corresponding persistent storage device. other mechanisms for determining which persistent storage device is going to reconstruct which chunks may be used without departing from the invention.

In step 364, chunks associated with the identified chunk are obtained from other persistent storage devices in the storage system. In one or more embodiments of the invention, the CAD of the persistent storage device uses the storage metadata to identify a number of chunks to be obtained for each chunk to be reconstructed. The storage metadata may specify a storage metadata slice associated with the chunk. The storage metadata slice may specify chunk metadata for other chunks of the metadata slice. The chunk metadata for the other chunks may include a storage location for each of the other chunks. Specifically, the storage location of a chunk may specify, for example, a persistent storage device and/or a disk sector of the persistent storage device in which the chunk is stored. The CAD may use the chunk metadata of the other chunks to obtain the other chunks. Obtaining the other chunks may include sending a request to each CAD of the other persistent storage devices storing the other chunks. The other CADs of the other persistent storage devices may each: (i) receive the request, (ii) use the information in the request (e.g., a CID of a chunk) to identify the location of the chunk in the data node; and (iii) send a response that includes the requested chunk back to the CAD (i.e., the CAD that sent the request received in step (i)). The process may be repeated for each chunk to be reconstructed.

In step 366, the identified chunk(s) are regenerated using the obtained chunks and stored in the storage system. In one or more embodiments of the invention, the identified chunk(s) are regenerated using the erasure coding algorithm applied to the data chunks and parity chunks of the data slice. The erasure coding algorithm may be applied to the other chunks (a portion of which may be data chunks while the other portion may be parity chunks that were generated using the erasure coding procedure) to generate a chunk. Each identified chunk may be regenerated using the corresponding erasure coding algorithm.

In one or more embodiments of the invention, the regenerated chunk(s) are stored in the persistent storage device. The regenerated chunk(s) may each be stored in a different persistent storage device without departing from the invention.

In step 368, the storage metadata is updated based on the storage of the regenerated chunks. Further, the update is sent to all other CADs of other persistent storage devices in the storage system. In one or more embodiments of the invention, the storage metadata is updated by updating the chunk metadata of each metadata slice entry associated with the regenerated chunk(s) with the new storage location of the regenerated chunk. Additionally, if the CID of the regenerated chunk has changed, the chunk metadata is further updated with the new CID. The CAD may send the update to the storage metadata to other CADs of the storage system. In this manner, the storage metadata is consistent throughout the storage system.

The following section describes another embodiment of how data reconstruction may be performed. The embodiment described below may be implemented in combination with one or more steps described above with respect to FIG. 3D. Turning to the embodiment, consider a scenario in which a data cluster includes five persistent storage devices: PSD1, PSD2, PSD3, PSD4, and PSD5. Stored among the persistent storage devices is data associated with slices S1, S2, and S3. S1 may be associated with data chunks D1, D2, D3, and parity chunk P1. S2 may be associated with data chunks E1, E2, E3, and parity chunk P2. S3 may be associated with data chunks F1, F2, F3, and parity chunk P3.

PSD1 may store data chunks D1 and E1 and storage metadata associated with slices S1 and S2. PSD2 may store chunks D2 and F1 and storage metadata associated with slices S2 and S3. PSD3 may store chunks D3, E2, and F2, and storage metadata associated with slices S1, S2, and S3. PSD4 may store chunks P1, E3, and F3 and storage metadata associated with slices S1, S2, and S3. PSD5 may store data chunks P2 and P3 and storage metadata associated with slices S2 and S3.

Continuing with the above example, at a later point in time, PSD2 fails. A storage controller managing the persistent storage devices sends a message to PSD2 to check on the status of PSD2. After receiving no response, the storage controller may determine that PSD2 has failed. The chunks that were stored in PSD2 (D2 and F1) will need to be rebuilt. In one or more embodiments of the invention, the storage controller sends a failed persistent storage device failure to each persistent storage device that stores chunks associated with S1 (which is associated D2) and S3 (which is associated with F1). In this scenario, PSD1, PSD3, and PSD4 are associated with S1 and PSD3, PSD4, and PSD5 are associated with S3. Therefore, PSD1, PSD3, PSD4, and PSD5 are each sent a failed persistent storage notification.

In one or more embodiments of the invention, the persistent storage devices that are to rebuild chunks D2 and F1 are determined based on a selection of the storage controller. In this scenario, the storage controller may select PSD1 to rebuild D2 and PSD3 to rebuild F1.

In one or more embodiments of the invention, the persistent storage devices that are to rebuild chunks D2 and F1 are determined based on a policy implemented by each of the persistent storage devices. The policy may be for example, based on the PSD identifiers (e.g., the lowest numbered persistent storage device associated with S1 is to rebuild D2), based on a first-to-respond basis (e.g., PSD1 notifies the storage controller that it can rebuild D2 first, and the storage controller notifies PSD3 and PSD4 to not rebuild D2), and/or based on any other policy without departing from the invention.

Example

Figure 4A:
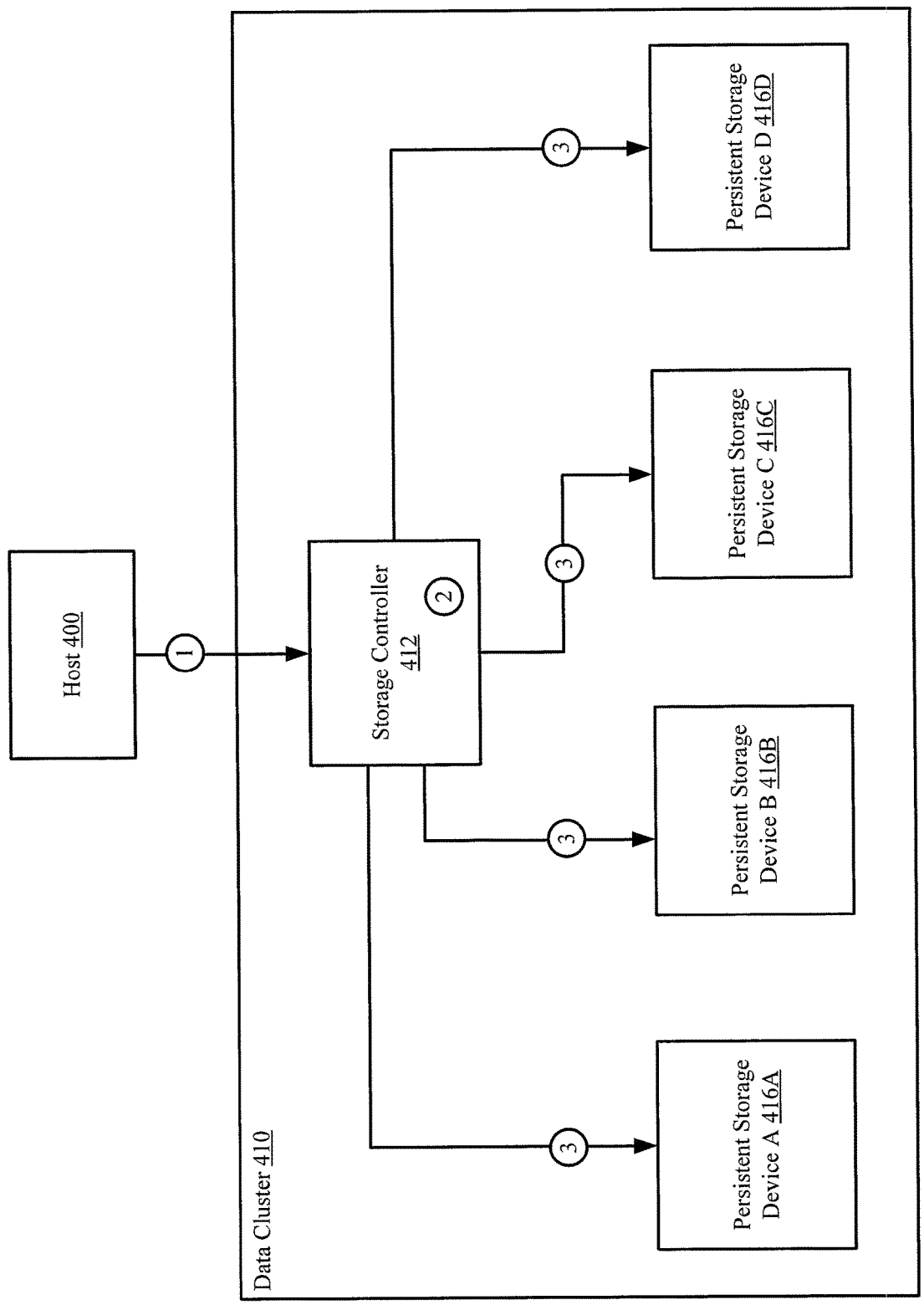
FIGS. 4A-4D show an example in accordance with one or more embodiments of the invention.

The following section describes an example. The example is not intended to limit the invention. The example is illustrated in FIGS. 4A-4D. Turning to the example, consider a scenario in which a data cluster obtains data from a host. The data may be a file. The host may request the file be stored in the data cluster in a 3:1 erasure coding procedure. FIG. 4A shows a diagram a system in accordance with one or more embodiments of the invention. The host (400) sends the request to a storage controller (412) of the data cluster (410) [1].

The storage controller (412) performs the method of FIG. 3A to store the obtained file. Specifically, the storage controller performs an erasure coding on the file [2]. In this example, assume that the erasure coding procedure includes implementing RAID 3. The result of the erasure coding procedure is a group of three data chunks and a parity chunk. A deduplication operation is applied to the data chunks and parity chunk to obtain deduplicated chunks. Because this file is not part of a previously-stored file, all three data chunks are deduplicated data chunks.

The deduplicated data chunks and the parity chunk are each stored in a unique persistent storage device (416A, 416B, 416C, 416D) [3]. Specifically, a first deduplicated data chunk is stored in persistent storage device A (416A), a second deduplicated data chunk is stored in persistent storage device B (416B), a third deduplicated data chunk is stored in persistent storage device C (416C), and the parity chunk is stored in persistent storage device D (416D).

In addition to storing the deduplicated data chunks and the parity chunks, the storage controller (412) generates a storage metadata slice entry in storage metadata. A unique identifier of each deduplicated data chunk and parity chunk is stored in storage metadata slice entry. The storage controller (412) updates a second storage controller (not shown) by sending a copy of the storage metadata to the persistent storage devices (416A, 416B, 416C, 416D).

Figure 4B:
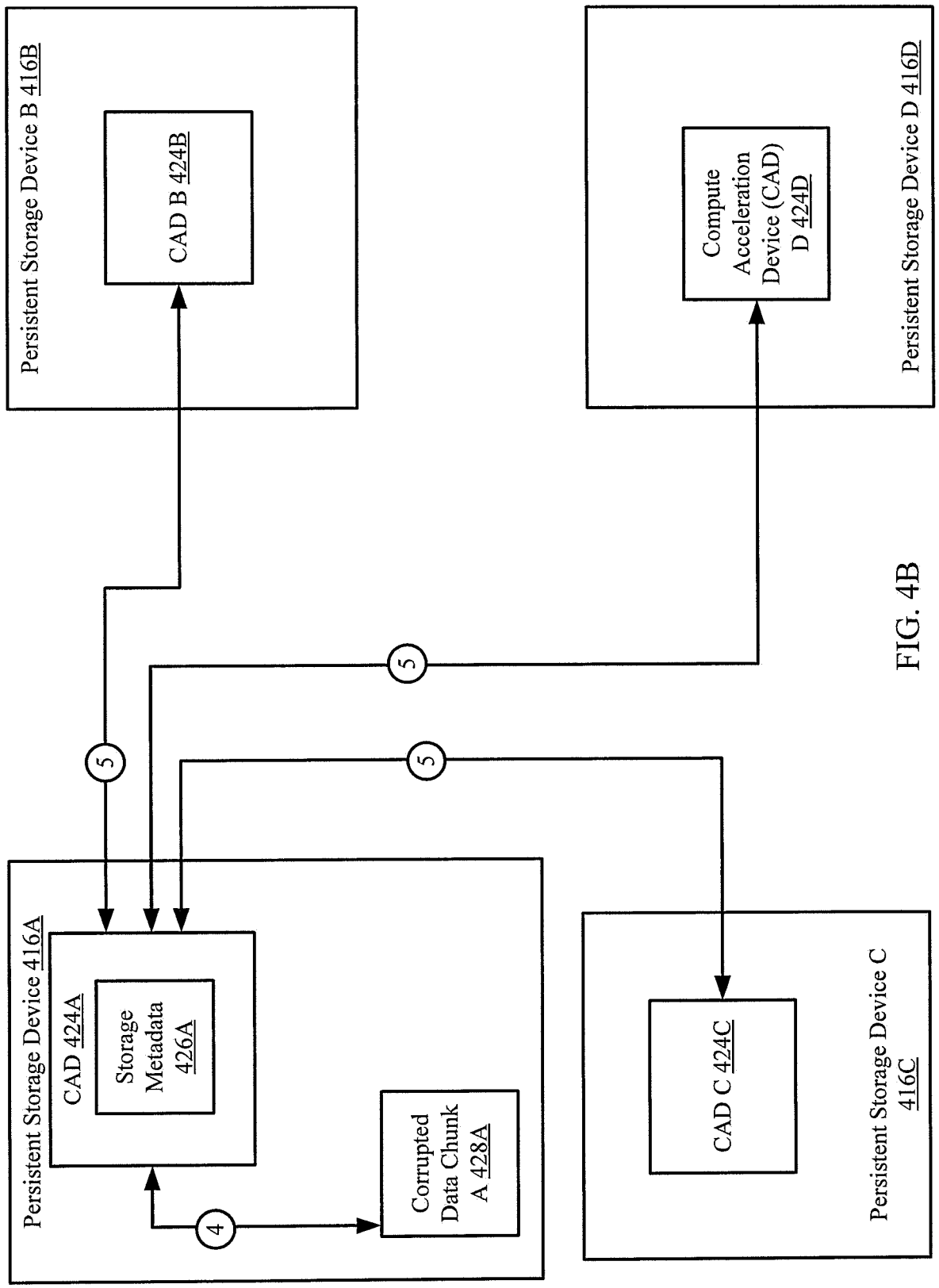

FIG. 4B shows a second diagram of the example system. Each persistent storage device (416A, 416B, 416C, 416D) performs continuous health-checks on chunks (i.e., data chunks and parity chunks) stored in their respective persistent storage devices (416A, 416B, 416C, 416D). As shown in FIG. 4B, a CAD (424A) of persistent storage device A (416A) performs a health-check on a data chunk (428A) [4]. The health-check for the data chunk (428A) includes generating a chunk identifier (CID) by performing a hash function on the data chunk (428A). The generated CID may be compared to a CID stored in the storage metadata (426A) to determine whether the generated CID matches a CID of the storage metadata (426A).

During the continuous health-checks, CAD (424A) identifies a mismatch in CIDs for a data chunk stored in persistent storage device A (416A). [4] Based on the mismatch, the CAD determines that the data chunk (428A) is corrupted. The CAD (424A) performs the method of FIG. 3B to reconstruct the data chunk. Specifically, the CAD (424A) uses the storage metadata (426A) stored in the CAD (424A) to identify a metadata slice entry associated with the corrupted data chunk (428A). The metadata slice entry includes chunk metadata associated with other chunks that may be used to reconstruct the data chunk. The chunk metadata further specifies storage locations of the other chunks (i.e., the other persistent storage devices (416B, 416C, 416D) in which the other chunks are stored). The CAD (416A) communicates to the other CADs (424B, 424C, 424D) of the other persistent storage devices (416B, 416C, 416D) to obtain the other chunks [5].

Figure 4C:
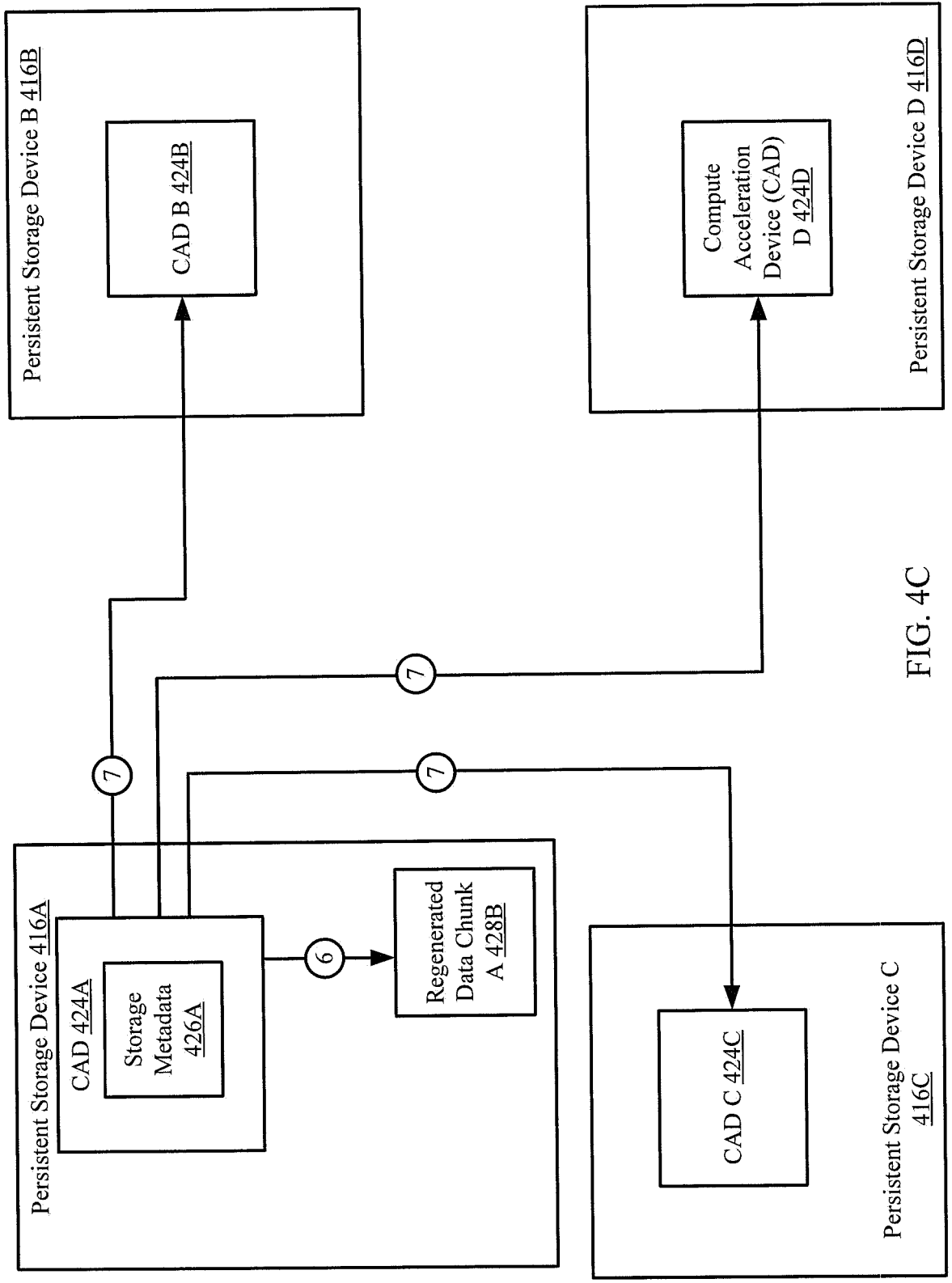

FIG. 4C shows a third diagram of the example system. The CAD (416A) uses the obtained chunks to regenerate the data chunk (428B) based on the erasure coding applied to the chunks by the storage controller [6]. The regenerated data chunk (428B) is stored in a new disk sector of the persistent storage device (416A). The new storage location is updated in the storage metadata (426A). Further, the update is propagated to the storage devices of the other CADs (424B, 424C, 424D) [7].

Figure 4D:
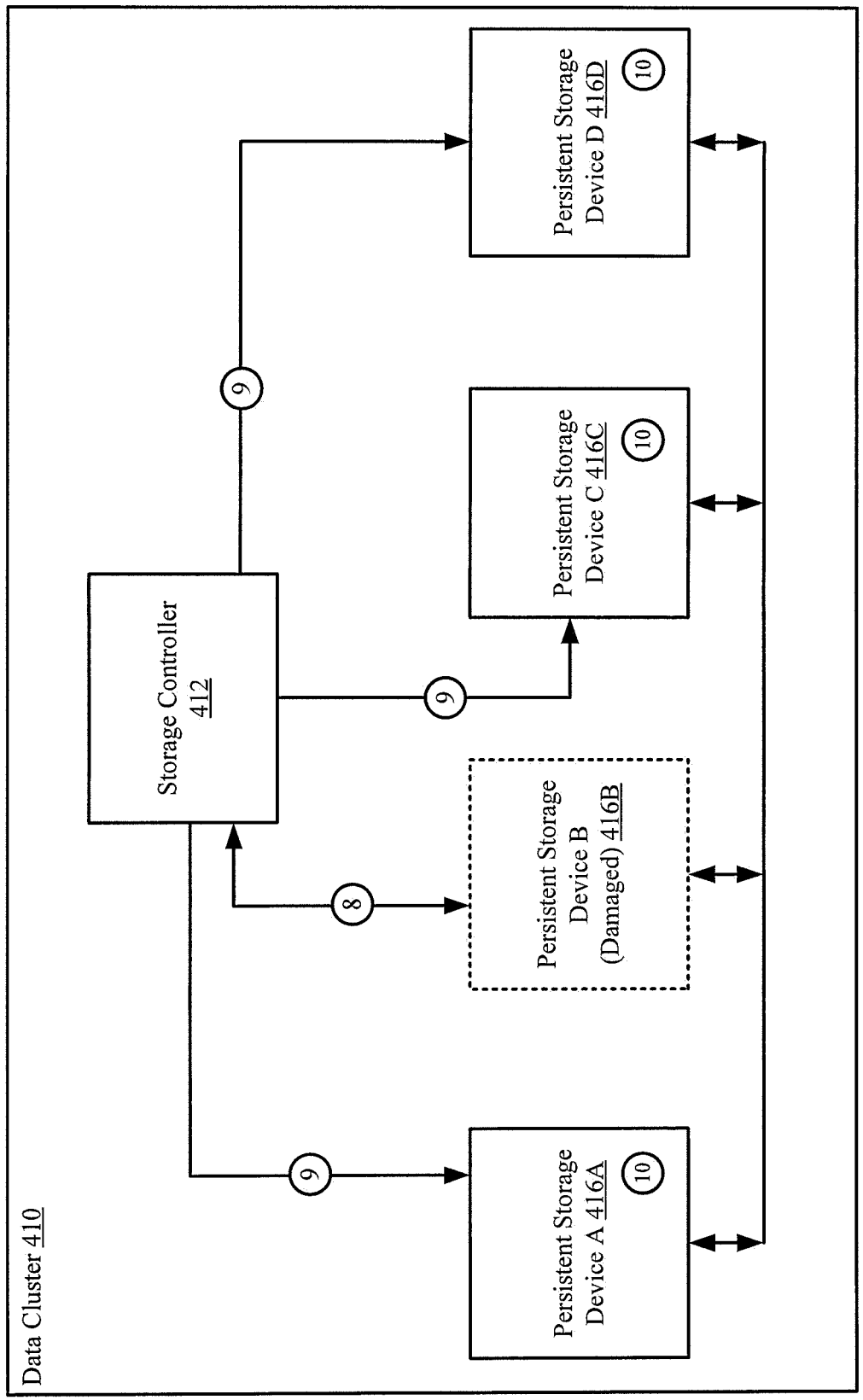

FIG. 4D shows a fourth diagram of the example system. In FIG. 4D, the storage controller (412) monitors the status of persistent storage device B (416B). The monitoring includes sending a status request to the persistent storage device B (416B), waiting a predetermined time for a response, and determining, based on the lack of response, that the persistent storage device B (416B) is damaged (or has otherwise failed) [8].

The storage controller (412), in response to the determination, sends a persistent storage device failure notification to each of the other persistent storage devices (416A, 416C, 416D) in the data cluster (410) [9]. Each persistent storage device failure notification may specify failure of persistent storage device B (416B) and a portion of the chunks stored in the failed persistent storage device B (416B). Specifically, the persistent storage device failure notification sent to persistent storage device A (416A) specifies a first portion of chunks of persistent storage device B (416B), the persistent storage device failure notification sent to persistent storage device C (416C) specifies a second portion of chunks of persistent storage device B (416B), and the persistent storage device failure notification sent to persistent storage device D (416D) specifies a third portion of chunks of persistent storage device B (416B). The first portion of chunks, the second portion of chunks, and the third portion of chunks collectively make up all of the chunks that were stored in persistent storage device B (416B) and which now need to be reconstructed.

The remaining persistent storage devices (416A, 416C, 416D) perform reconstruction of the chunks specified in their respective persistent storage device failure notifications in accordance with FIG. 3D. The reconstruction includes each of the remaining persistent storage devices (416A, 416C, 416D) communicating with each other to obtain chunks stored in the remaining persistent storage devices (416A, 416C, 416D) and regenerating the requested chunks using the obtained chunks. The regenerated chunks may be stored on the remaining active persistent storage devices (e.g., the devices on which they are generated) until such time as new persistent storage device is added to the data cluster to replace persistent storage device B. The locations of the regenerated chunks will be distributed to the other persistent storage devices and the storage controller.

End of Example

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the reliability of storing data in a data cluster. The reliability is improved by equipping each persistent storage device in a storage system with a device that includes functionality for performing continuous health-checks on portions of data stored in the persistent storage device. The health-checks may be offloaded from storage controllers communicating with the hosts that generated the data to minimize decrease in performance. Embodiments of the invention further equip the device of each persistent storage device to perform these health-checks continuously, thus increasing the availability of the data by proactively seeking corrupted data and reconstructing the corrupted data prior to being requested by the host.

In addition, each storage controller is equipped to health-check data of persistent storage devices allocated to another storage controller is the first storage controller determines that the second storage controller is not in a functioning state. In this manner, all persistent storage devices are health-checked even if a storage controller performing health-checks is unable to perform the health-checks to its allocated persistent storage devices.

Thus, embodiments of the invention may address the problem of inefficient use of computing resources. This problem arises due to the technological nature of the environment in which backup operations are performed.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing data, the method comprising:
   identifying, by a compute acceleration device (CAD) of a persistent storage device, a first chunk, stored in the persistent storage device, to be health-checked using storage metadata;
   generating a first chunk identifier using the first chunk;
   making a determination that the first chunk identifier does not match a second chunk identifier stored in the storage metadata; and
   in response to the determination:
      obtaining a plurality of chunks associated with the first chunk from a plurality of persistent storage devices of a storage system, wherein the storage system comprises the persistent storage device and the plurality of persistent storage devices;
      regenerating the first chunk using the plurality of chunks to generate a new first chunk;
      storing the new first chunk in the persistent storage device; and
      updating the storage metadata based on storage of the new first chunk.

2. The method of claim 1, further comprising:
   obtaining a persistent storage device failure notification of a second persistent storage device from a storage controller, wherein the storage system does not comprise the storage controller;
   identifying, using the storage metadata, a second chunk associated with the second persistent storage device;
   obtaining a second plurality of chunks associated with the second chunk from a second plurality of persistent storage devices;
   regenerating the second chunk using the second plurality of chunks to generate a new second chunk;
   storing the new second chunk in the persistent storage device; and
   updating the storage metadata based on the storage of the new second chunk.

3. The method of claim 2, wherein the persistent storage device failure notification is obtained from a storage controller, and wherein the persistent storage device failure notification specifies the second persistent storage device.

4. The method of claim 3, wherein the persistent storage device failure notification further specifies the second chunk.

5. The method of claim 1, wherein obtaining the plurality of chunks associated with the first chunk from the plurality of persistent storage devices comprises:
   sending a request to a CAD of each persistent storage device of the plurality of persistent storage devices; and
   obtaining a chunk from each CAD of each persistent storage device of the plurality of persistent storage devices after sending the request.

6. The method of claim 1, wherein the storage metadata is stored in the CAD.

7. The method of claim 1, wherein the storage system further comprises a plurality of data nodes, wherein each data node comprises a portion of the plurality of persistent storage devices.

8. A non-transitory computer readable medium comprising computer readable program code, which when executed by a computer processor enables the computer processor to perform a method for managing data, the method comprising:
   identifying, by a compute acceleration device (CAD) of a persistent storage device, a first chunk, stored in the persistent storage device, to be health-checked using storage metadata;
   generating a first chunk identifier using the first chunk;
   making a determination that the first chunk identifier does not match a second chunk identifier stored in the storage metadata; and
   in response to the determination:
      obtaining a plurality of chunks associated with the first chunk from a plurality of persistent storage devices of a storage system, wherein the storage system comprises the persistent storage device and the plurality of persistent storage devices;
      regenerating the first chunk using the plurality of chunks to generate a new first chunk;
      storing the new first chunk in the persistent storage device; and
      updating the storage metadata based on storage of the new first chunk.

9. The non-transitory computer readable medium of claim 8, the method further comprising:
   obtaining a persistent storage device failure notification of a second persistent storage device from a storage controller, wherein the storage system does not comprise the storage controller;
   identifying, using the storage metadata, a second chunk associated with the second persistent storage device;
   obtaining a second plurality of chunks associated with the second chunk from a second plurality of persistent storage devices;
   regenerating the second chunk using the second plurality of chunks to generate a new second chunk;
   storing the new second chunk in the persistent storage device; and
   updating the storage metadata based on the storage of the new second chunk.

10. The non-transitory computer readable medium of claim 9, wherein the persistent storage device failure notification is obtained from a storage controller, and wherein the persistent storage device failure notification specifies the second persistent storage device.

11. The non-transitory computer readable medium of claim 10, wherein the persistent storage device failure notification further specifies the second chunk.

12. The non-transitory computer readable medium of claim 8, wherein obtaining the plurality of chunks associated with the first chunk from the plurality of persistent storage devices comprises:
sending a request to a CAD of each persistent storage device of the plurality of persistent storage devices; and
obtaining a chunk from each CAD of each persistent storage device of the plurality of persistent storage devices after sending the request.

13. The non-transitory computer readable medium of claim 8, wherein the storage metadata is stored in the CAD.

14. The non-transitory computer readable medium of claim 8, wherein the storage system further comprises a plurality of data nodes, wherein each data node comprises a portion of the plurality of persistent storage devices.

15. A data cluster, comprising:
a storage controller;
a persistent storage device;
a plurality of persistent storage devices; and
a compute acceleration device (CAD) operating on the persistent storage device,
wherein the first storage controller is programmed to:
identify, by the CAD, a first chunk, stored in the persistent storage device, to be health-checked using storage metadata;
generate a first chunk identifier using the first chunk;
make a determination that the first chunk identifier does not match a second chunk identifier stored in the storage metadata; and
in response to the determination:
obtain a plurality of chunks associated with the first chunk from the plurality of persistent storage devices of a storage system, wherein the storage system comprises the persistent storage device and the plurality of persistent storage devices;
regenerate the first chunk using the plurality of chunks to generate a new first chunk;
store the new first chunk in the persistent storage device; and
update the storage metadata based on storage of the new first chunk.

16. The data cluster of claim 15, wherein the CAD is further programmed to:
obtain a persistent storage device failure notification of a second persistent storage device from a storage controller, wherein the storage system does not comprise the storage controller;
identify, using the storage metadata, a second chunk associated with the second persistent storage device;
obtain a second plurality of chunks associated with the second chunk from a second plurality of persistent storage devices;
regenerate the second chunk using the second plurality of chunks to generate a new second chunk;
store the new second chunk in the persistent storage device; and
update the storage metadata based on the storage of the new second chunk.

17. The data cluster of claim 16, wherein the persistent storage device failure notification is obtained from a storage controller, and wherein the persistent storage device failure notification specifies the second persistent storage device.

18. The data cluster of claim 17, wherein the persistent storage device failure notification further specifies the second chunk.

19. The data cluster of claim 17, wherein obtaining the plurality of chunks associated with the first chunk from the plurality of persistent storage devices comprises:
sending a request to a CAD of each persistent storage device of the plurality of persistent storage devices; and
obtaining a chunk from each CAD of each persistent storage device of the plurality of persistent storage devices after sending the request.

20. The data cluster of claim 15, wherein the storage system further comprises a plurality of data nodes, wherein each data node comprises a portion of the plurality of persistent storage devices.

* * * * *